United States Patent
Kogan et al.

(10) Patent No.: US 10,275,923 B2
(45) Date of Patent: Apr. 30, 2019

(54) DETERMINING AND PRESENTING SOLAR FLUX INFORMATION

(71) Applicant: Google LLC, Mountain View, CA (US)

(72) Inventors: David Kogan, Natick, MA (US); Carl Elkin, Arlington, MA (US); Warren Wang, Alameda, CA (US); Carlos David Correa Ocampo, San Jose, CA (US)

(73) Assignee: Google LLC, Mountain View, CA (US)

( * ) Notice: Subject to any disclaimer, the term of this patent is extended or adjusted under 35 U.S.C. 154(b) by 53 days.

(21) Appl. No.: 15/019,648

(22) Filed: Feb. 9, 2016

(65) Prior Publication Data

US 2017/0228913 A1   Aug. 10, 2017

(51) Int. Cl.
| | |
|---|---|
| *G06T 17/05* | (2011.01) |
| *G06T 19/20* | (2011.01) |
| *G06T 13/60* | (2011.01) |
| *G06F 3/0484* | (2013.01) |

(52) U.S. Cl.
CPC .......... *G06T 13/60* (2013.01); *G06F 3/04842* (2013.01); *G06F 3/04847* (2013.01); *G06T 17/05* (2013.01); *G06T 19/20* (2013.01)

(58) Field of Classification Search
CPC ......... G06T 13/60; G06T 17/05; G06T 19/20; G06F 3/04842; G06F 3/04847
See application file for complete search history.

(56) References Cited

U.S. PATENT DOCUMENTS

| | | | | |
|---|---|---|---|---|
| 2008/0105045 | A1* | 5/2008 | Woro | F24J 2/40 73/170.27 |
| 2012/0035887 | A1* | 2/2012 | Augenbraun | G06T 15/06 703/1 |
| 2014/0067332 | A1* | 3/2014 | Chen | G06F 17/5004 703/1 |
| 2014/0207431 | A1* | 7/2014 | Reinhart | G06F 17/5009 703/2 |
| 2015/0161442 | A1* | 6/2015 | Sadka | G06Q 10/043 382/113 |
| 2015/0205008 | A1* | 7/2015 | Ferrer | G01W 1/10 702/3 |

OTHER PUBLICATIONS

SolarGIS, Methods and Inputs, http://solargis.info/doc/methods, retrieved from the Internet Jan. 4, 2016.
(Continued)

*Primary Examiner* — Jacinta M Crawford
(74) *Attorney, Agent, or Firm* — Lerner, David, Littenberg, Krumholz & Mentlik, LLP

(57) ABSTRACT

Aspects of the disclosure relate to a method for providing an animated presentation. The method includes identifying a geographic area and identifying solar flux for the geographic area. A plurality of images of the geographic area then is generated to display the solar flux. Each image in the plurality of images displays solar flux at different points in time of a day. The animated presentation is generated by displaying the plurality of images in chronological order with a transition between images in the plurality of images and provided for display on a display to a user.

20 Claims, 7 Drawing Sheets

(56) References Cited

OTHER PUBLICATIONS

Satellite Imaging Corporation, IKONOS Stereo Satellite Imagery, http://www.satimagingcorp.com/satellite-sensors/ikonos/ikonos-stereo-satellite-images/, retrieved from the Internet Jan. 4, 2016.
Ian Poole, G3YWX, "Understanding Solar Indices," QST, Sep. 2002, http://www.arrl.org/files/file/Technology/tis/info/pdf/0209038.pdf.
Solargis, Free Download of Solar Radiation Maps: Global Horizontal Irradiation (GHI), http://solargis.info/doc/free-solar-radiation-maps-GHI, retrieved from the Internet Nov. 12, 2015.
Atlas of the Solar Radiation Data Manual for Flat-Plate and Concentrating Collectors, http://rredc.nrel.gov/solar/old_data/nsrdb/1961-1990/redbook/atlas/, retrieved from the Internet Nov. 12, 2015.
National Renewable Energy Laboratory, Solar Prospector, http://maps.nrel.gov/prospector, retrieved from the Internet Nov. 12, 2015.
Mapdwell Solar System, Discover Your Potential Select a System Get Solar!, http://www.mapdwell.com/en/boston retrieved from the Internet Nov. 12, 2015.
User Guide: "Solar: SunCast," 1-20, Dec. 31, 2014 (Dec. 31, 2014), XP055354322, Retrieved from the Internet: <http://www.iesve.com/downloads/help/ve2014/Solar/SunCast.pdf>. 42 pages.
Matej Brumen et al: "GIS Application for Solar Potential Estimation on Buildings Roofs," Dec. 31, 2014 (Dec. 31, 2014), XP055354327, Retrieved from the Internet: <https://www.thinkmind.org/download.php?articleid=web_2014_1_10_40046>. 6 pages.
Anonymous: "Australian Photovoltaic Institute ," Nov. 15, 2015 (Nov. 15, 2015), XP055354148, Retrieved from the Internet: <https://web.archive.org/web/20151115031237/http://pv-map.apvi.org.au/potential/cityjsydney#13/-33.8919/151.2119>. 4 pages.
Anonymous: "Calculation Methods IES Virtual Environment 6.4 CIBSE Heat Loss & Heat Gain (ApacheCalc) Contents," Feb. 3, 2010 (Feb. 3, 2010), pp. 1-39, XP055354333, Retrieved from the Internet: <www.iesve.com/content/downloadasset_5654>. 10 pages.
International Search Report and Written Opinion for PCT Application No. PCT/US2016/065584, dated Mar. 21, 2017. 13 pages.
International Preliminary Report on Patentability for Application No. PCT/US2016/065584, dated Aug. 23, 2018. 8 pages.

\* cited by examiner

300A

300B

DETERMINING AND PRESENTING SOLAR FLUX INFORMATION

BACKGROUND

Solar flux is the spectral irradiance received by the Earth's surface from the sun, measured in $W \cdot m^{-2} \cdot Hz^{-1}$. It is used as a basic indicator of solar activity and can therefore be used to guide installation choices of photovoltaic solar panels. Photovoltaic solar panels use light energy from the sun to generate electricity. Solar flux is typically affected by various factors—orientation of the roof relative to the sun, angle of the roof, roof shape and obstacles, shadows cast by trees and other buildings, seasonal weather patterns, etc. Solar flux has typically been presented in static, two-dimensional (2D) forms; for example, using a color gradient to represent a snapshot of solar power on the roofs of buildings on a map.

BRIEF SUMMARY

Aspects of the disclosure provide a method. The method includes identifying, by one or more processors, a geographic area; identifying, by the one or more processors, solar flux for the geographic area; generating, by the one or more processors, a plurality of images of the geographic area displaying the solar flux, each image in the plurality of images displaying solar flux at different points in time of a day; generating, by the one or more processors, an animated presentation by displaying the plurality of images in chronological order with a transition between images in the plurality of images; and providing, by the one or more processors, the animated presentation for display on a display to a user.

In one example, the plurality of images is generated by using the solar flux to project a gradient of colors corresponding to amount of solar flux onto areas in the plurality of images where a solar panel may be installed. In another example, the different points in time are spaced apart at regular intervals. In yet another example, the transition between the images includes a gradual change in opacity of one or more images. In this example, the transition between the images includes a gradual increase in opacity of a first image of the plurality of images and a gradual decrease in opacity of a second image of the plurality of images.

In a further example, the transition between the images is controllable based on user input selecting a point in time within the time frame. In this example, the user input is received via a slider tool. In yet another example, the geographic area and the time frame are identified by receiving user input related to the geographic area and the time frame. In another example, the method also includes generating, by the one or more processors, a three-dimensional model of the geographic area; and projecting, by the one or more processors, the solar flux into the three-dimensional model; wherein the plurality of images is of a selected view of the three-dimensional model. In still another example, the geographic area comprises a plurality of smaller areas and the solar flux comprises solar flux for each of the plurality of smaller areas, and wherein the plurality of images of the geographic area is generated by batch processing the solar flux for each of the plurality of smaller areas.

Other aspects of the disclosure provide for a system that includes one or more processors. The one or more processors are configured to identify a geographic area; identify solar flux for the geographic area; generate a plurality of images of the geographic area displaying the solar flux, each image in the plurality of images displaying solar flux at different points in time of a day; generate an animated presentation by displaying the plurality of images in chronological order with a transition between images in the plurality of images; and provide the animated presentation for display on a display to a user.

In one example, the one or more processors are also configured to generate a three-dimensional model of the geographic area; and project the solar flux into the three-dimensional model; wherein the plurality of images is of a selected view of the three-dimensional model. In another example, the solar flux is projected into the three-dimensional model by projecting a gradient of colors corresponding to amount of solar flux onto areas in the plurality of images where a solar panel may be installed. In yet another example, the different points in time are spaced apart at regular intervals.

In a further example, the transition between the images includes a gradual change in opacity of one or more images. In this example, the transition between the images includes a gradual increase in opacity of a first image of the plurality of images and a gradual decrease in opacity of a second image of the plurality of images. In yet another example, the one or more processors are also configured to receive user input related to the geographic area and the time frame; and send the animated presentation to a client device for display.

Further aspects of the disclosure provide for a non-transitory, tangible machine-readable medium on which instructions are stored. The instructions, when executed by one or more processors, cause the one or more processors to perform a method. The method includes selecting a geographic area; identifying solar flux for the geographic area; generating a plurality of images of the geographic area displaying the solar flux, each image in the plurality of images displaying solar flux at different points in time of a day; generating an animated presentation by displaying the plurality of images in chronological order with a transition between images in the plurality of images; and providing the animated presentation for display on a display to a user.

In one example, the method also includes generating a three-dimensional model of the geographic area; and projecting the solar flux into the three-dimensional model; wherein the plurality of images is of a selected view of the three-dimensional model. In another example, the transition between the images includes a gradual change in opacity of one or more images.

DETAILED DESCRIPTION

Overview

Figure 1:
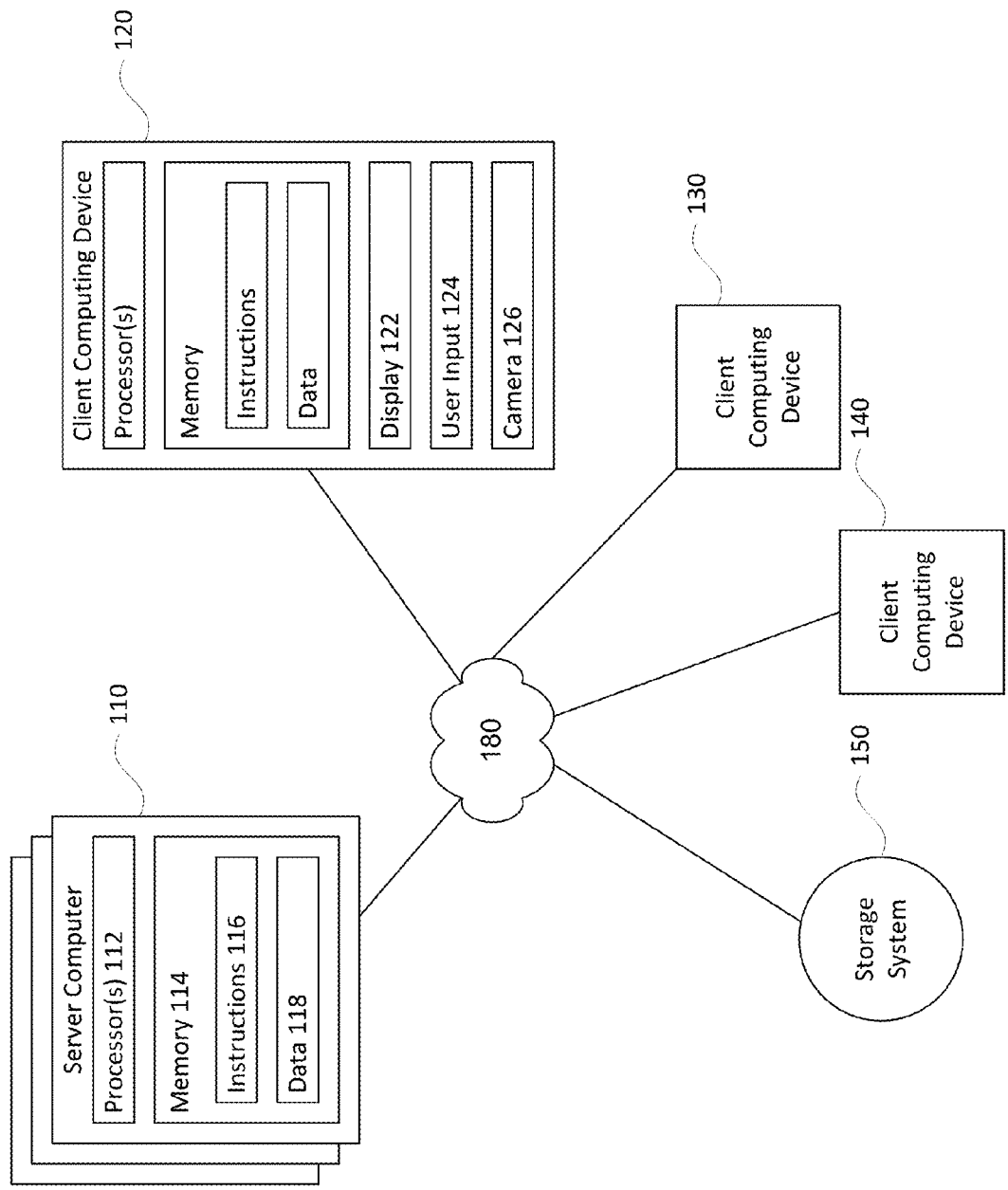
FIG. 1 is a functional diagram of an example system in accordance with aspects of the disclosure.

The technology relates to a presentation of solar flux for more comprehensive communication of information related to solar flux. By providing solar flux in an animation and/or on a three-dimensional (3D) model, more information is readily available to a user. The user is thereby able to more quickly and accurately understand the solar flux being presented.

In order to provide an animated presentation of solar flux, the solar flux may be generated using stereo imagery and/or range information captured at various geographic areas over various periods of times. Stereo imagery involves taking at least two images of a given geographic area from at least two different satellite positions. The images may be captured using sensors from a variety of locations, such as from satellites or planes. Range-finding may involve use of lidar or other similar technology to determine range information or distances to objects from a geographic point. From stereo imagery and range information, physical environment information may be derived. Weather and climate information may be combined with the physical environment information to determine the solar flux.

A geographic area and a time frame may be identified. These may be identified based on a particular user request for solar flux for a particular geographic area over a predetermined period. The geographic area indicates a building, a block, or a city, etc. The time frame indicates what type of weather and climate information of the geographic area is relevant.

Using the generated solar flux, a plurality of images may be generated for the identified geographic area. The plurality of images may be 2D maps of the geographic area viewed from above displaying solar flux corresponding to a given point in time projected onto surfaces where it is also possible to install a solar panel. The solar flux may be displayed as a gradient of colors corresponding to amount of solar flux for a given point in time. Each image in the plurality of images may display solar flux at different points in time in the time frame.

An animated presentation may be created by displaying the plurality of images in chronological order with transitions between pairs of images in the plurality of images. The transitions between the images may include a gradual change in opacity of one or more images. In one example, a first image of the plurality of images may be overlaid with a second image of the plurality of images such that geographic locations in the first image are overlaid by the same geographic locations in the second image. The first image may present solar at a first point in time and be displayed at full opacity. The second image may present solar at a second point in time later than the first point in time and be displayed at no opacity. To transition from the first image to the second image, the opacity of the first image may gradually decrease, and the opacity of the second image is gradually increased until only the second image is visible.

Rather than using a plurality of 2D images to create an animation, a 3D model of the geographic area may be used. The solar flux may be projected into the 3D model. The 3D model may be generated from the same stereo imagery and/or range information collected for generating solar flux. The 3D model may then be displayed with the solar flux.

Example Systems

Figure 2:
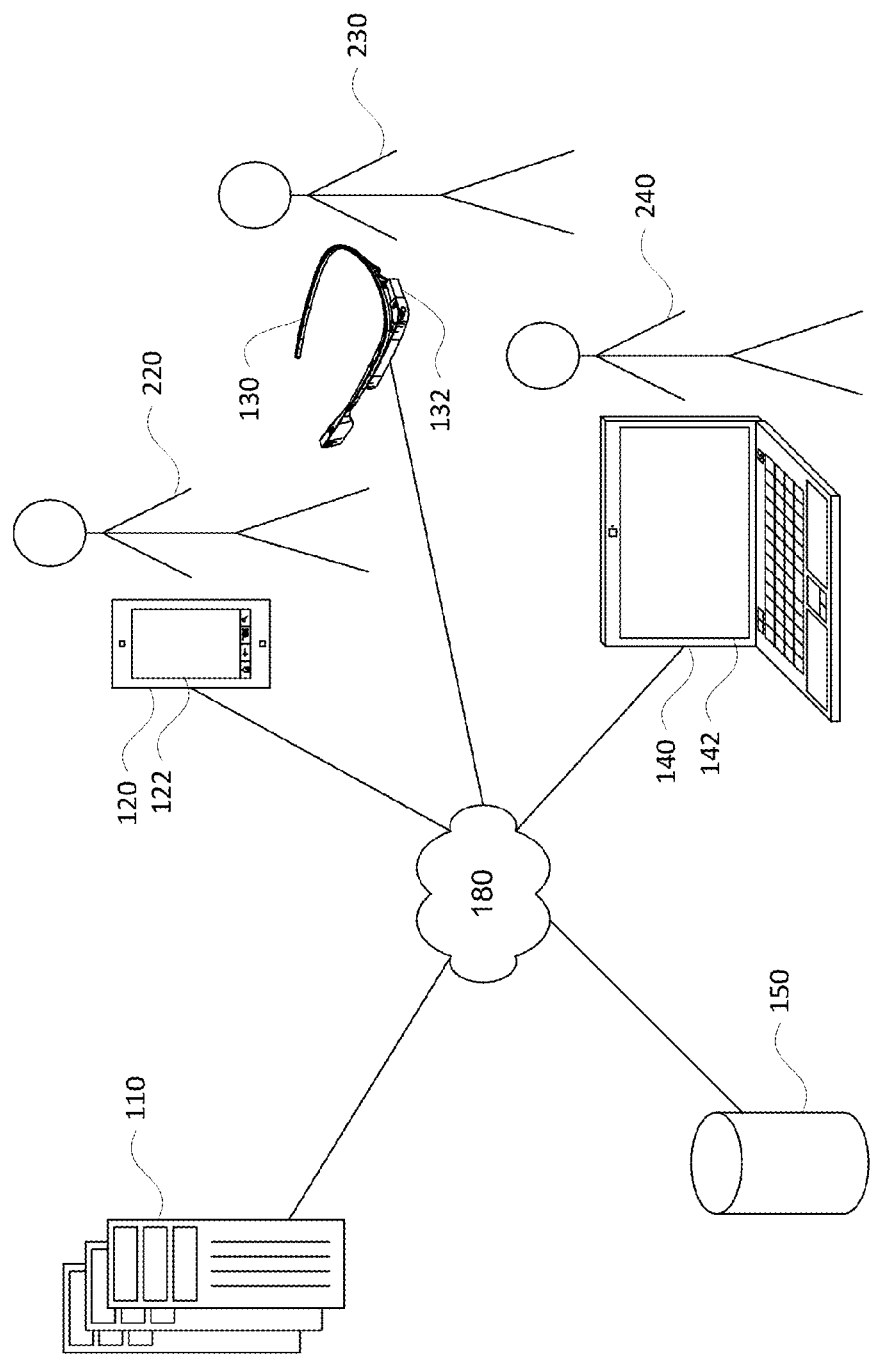
FIG. 2 is a pictorial diagram of the example system of FIG. 1.

FIGS. 1 and 2 include an example system 100 in which the features described herein may be implemented. It should not be considered as limiting the scope of the disclosure or usefulness of the features described herein. In this example, system 100 can include one or more computing devices 110, 120, 130, and 140, as well as storage system 150. One or more computing devices 110 can contain one or more processors 112, memory 114 and other components typically present in general purpose computing devices. Memory 114 of the one or more computing devices 110 can store information accessible by one or more processors 112, including instructions 116 that can be executed by the one or more processors 112. Memory 114 can also include data 118 that can be retrieved, manipulated or stored by the processor. The memory can be of any non-transitory type capable of storing information accessible by the processor, such as a hard-drive, memory card, ROM, RAM, DVD, CD-ROM, write-capable, and read-only memories.

The instructions 116 can be any set of instructions to be executed directly, such as machine code, or indirectly, such as scripts, by the processor. In that regard, the terms "instructions," "application," "steps" and "programs" can be used interchangeably herein. The instructions can be stored in object code format for direct processing by the processor, or in any other computing device language including scripts or collections of independent source code modules that are interpreted on demand or compiled in advance. Functions, methods and routines of the instructions are explained in more detail below.

Data 118 can be retrieved, stored or modified by processor 112 in accordance with the instructions 116. For instance, although the subject matter described herein is not limited by any particular data structure, the data can be stored in computer registers, in a relational database as a table having many different fields and records, or structured (e.g., XML documents). The data can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

The one or more processors 112 can include any conventional processors, such as a commercially available CPU. Alternatively, the processor can be a dedicated component such as an ASIC or other hardware-based processor. Although not necessary, one or more computing devices 110 may include specialized hardware components to perform specific computing processes, such as decoding video, matching video frames with images, distorting videos, encoding distorted videos, etc. faster or more efficiently.

Although FIG. 1 functionally illustrates the processor(s), memory, and other elements of computing device 110 as being within the same block, the processor, computer, computing device, or memory can actually comprise multiple processors, computers, computing devices, or memories that may or may not be stored within the same physical housing. For example, the memory can be a hard drive or other storage media located in one or more housings different from those of the one or more computing devices 110. Accordingly, references to a processor, computer, computing device, or memory will be understood to include references to a collection of processors, computers, computing devices, or memories that may or may not operate in parallel. For example, the computing devices 110 may include server computing devices operating as a load-balanced server farm. Yet further, although some functions described below are indicated as taking place on a single computing device having a single processor, various aspects of the subject matter described herein can be implemented by a plurality of computing devices, for example, communicating information over network 180.

The one or more server computing devices 110 can be at various nodes of a network 180 and capable of directly and indirectly communicating with other nodes of network 180. Although only a few computing devices are depicted in FIGS. 1-2, it should be appreciated that a typical system can include a large number of connected computing devices, with each different computing device (as well as collection device) being at a different node of the network 180. The network 180 and intervening nodes described herein can be interconnected using various protocols and systems, such that the network can be part of the Internet, World Wide Web, specific intranets, wide area networks, or local networks. The network can utilize standard communications protocols, such as Ethernet, Wi-Fi and HTTP, protocols that are proprietary to one or more companies, and various combinations of the foregoing. Although certain advantages are obtained when information is transmitted or received as noted above, other aspects of the subject matter described herein are not limited to any particular manner of transmission of information.

As an example, the one or more server computing devices 110 may include one or more web servers that are capable of communicating with storage system 150 as well as computing devices 120, 130, and 140 via the network 180. For example, one or more server computing devices 110 may use network 180 to transmit and present information to a user, such as user 220, 230, or 240, on a display, such as displays 122, 132, or 142 of computing devices 120, 130, or 140. In this regard, computing devices 120, 130, and 140 may be considered client computing devices and may perform all or some of the features described below.

Each of the client computing devices may be configured similarly to the server computing devices 110, with one or more processors, memory and instructions as described above. Each client computing device 120, 130 or 140 may be a personal computing device intended for use by a user 220, 250, 250, and have all of the components normally used in connection with a personal computing device such as a central processing unit (CPU), memory (e.g., RAM and internal hard drives) storing data and instructions, a display such as displays 122, 132, or 142 (e.g., a monitor having a screen, a touch-screen, a projector, a television, or other device that is operable to display information), and user input device 124 (e.g., a mouse, keyboard, touch screen or microphone). The client computing device may also include a camera for recording video streams, speakers, a network interface device, and all of the components used for connecting these elements to one another.

Although the client computing devices 120, 130 and 140 may each comprise a full-sized personal computing device, they may alternatively comprise mobile computing devices capable of wirelessly exchanging data with a server over a network such as the Internet. By way of example only, client computing device 120 may be a mobile phone or a device such as a wireless-enabled PDA, a tablet PC, or a netbook that is capable of obtaining information via the Internet. In another example, client computing device 130 may be a head-mounted computing system. As an example the user may input information using a small keyboard, a keypad, microphone, using visual signals with a camera, or a touch screen.

Storage system 150 may store various types of information. As described in more detail below, the storage system 150 may store solar flux of geographic areas, various images of geographic areas, including map images, physical environment information of geographic areas, and weather and climate information of geographic areas. Stored images may include one or more of landscapes, landmarks, a building, etc. These images may be part of image files that are associated with other information, such as an image identifier that can be used to retrieve the image, the time the image was created, where the image was taken, from what angle the image is being viewed, and image format (JPEG, TIFF, etc.). The image file may contain a timestamp with information such as a date and the time of when the image was captured. The image file may also contain pose information including geographic location information indicating the location (such as latitude and longitude or other location coordinates), and orientation information (heading) at which the image was captured (e.g., which part of the image is oriented towards "North", etc.).

The storage system 150 may also store 3D geometry data and algorithms for analyzing and manipulating images. As explained above and described in more detail below, this 3D geometry data may correspond to points on the surface of any objects in the images of storage system 150.

As with memory 114, storage system 150 can be of any type of computerized storage capable of storing information accessible by server computing devices 110, such as a hard-drive, memory card, ROM, RAM, DVD, CD-ROM, write-capable, and read-only memories. In addition, storage system 150 may include a distributed storage system where data is stored on a plurality of different storage devices which may be physically located at the same or different geographic locations. Storage system 150 may be connected to the computing devices via the network 180 as shown in FIGS. 1 and 2 and/or may be directly connected to or incorporated into any of the computing devices 110-140 (not shown).

Example Methods

In addition to the operations described above and illustrated in the figures, various operations will now be described. The following operations do not have to be performed in the precise order described below. Rather, various steps can be handled in a different order or simultaneously, and steps may also be added or omitted.

A user, such as user 220, may user his or her client computing device 120 to request an animated presentation of solar flux for a geographic area. The user request may include a geographic area, such as a street address, as well as a time frame, for instance a day, a week, a month, a season, a year, etc. The time frame identifies a period of time of year over which weather and climate may be gathered and averaged in order to determine the solar flux. For example, the user request may be for an animated presentation of solar flux at 123 Main Street, Anytown, Calif. 12345 for the month of March. Thus, in this example, the geographic area is 123 Main Street, Anytown, Calif. 12345, and the time frame is the month of March.

The request may be sent to and received by one or more computing devices, such as the server computing devices 110. In response, these computing devices may generate the solar flux, for instance using stereo imagery and/or range information captured at the geographic area, here 123 Main Street, Anytown, Calif. 12345, during the month of March. The server computing devices 110 may use the data from stereo imagery and/or range-finding and generate the solar flux by deriving physical environment information from the data. Physical environment information may include location information—such as address, lat/long coordinates, or relative position—and geometry information—such as the angle of the roof, location of trees. The physical environment information may be used to model buildings and objects around them. Weather and climate information, such as time of sunrise and sunset, weather patterns, location, angle, and intensity of the sun, etc., may then be combined with the physical environment information to determine the solar flux. The weather and climate information that is used may be the average for the given time frame.

Figure 3A:
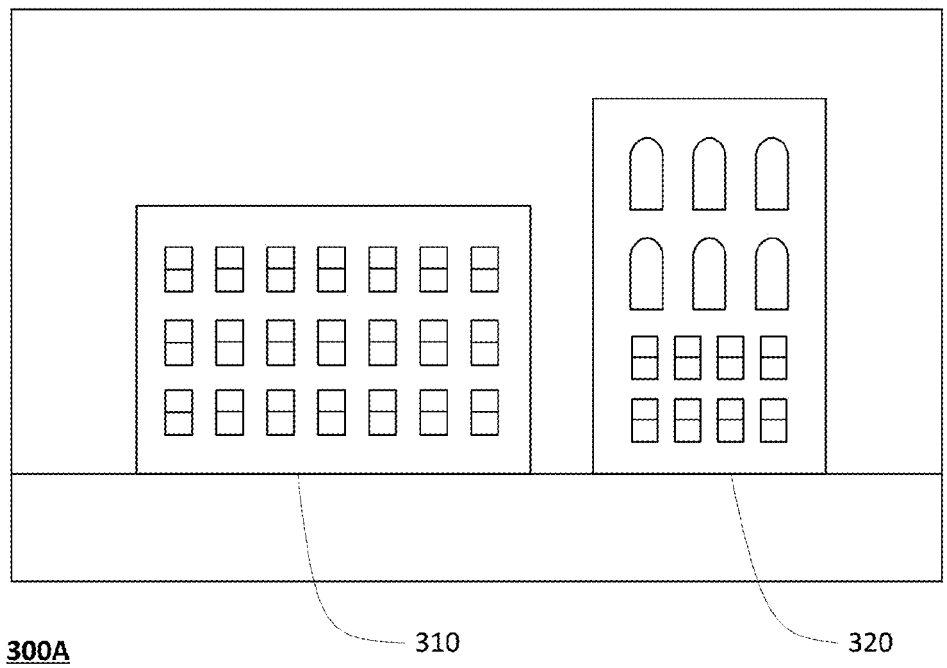
FIG. 3A is a street view of buildings in a geographic area in accordance with aspects of the disclosure.

Shown in FIG. 3A is a street view of a first building 310 and a second building 320 that are in an identified geographic area, such as 123 Main Street, Anytown, Calif. 12345. Using stereo imagery and/or lidar captured during the time period, here the month of March, physical environment information of the first and second buildings 310, 320 is gathered. Physical environment information includes indication that the second building 320 neighbors and is east of the first building 310. Geometry information of the geographic area includes the shape, width, length, and height of the first building, as well as the shape, width, length, and height of the second building. Also included in the geometry information of the geographic area is that the height of the second building 320 is greater than the height of the first building 310.

Again, using the time frame identified in the user request, the month of March, the weather and climate information for the geographic area for the month of March may be retrieved from the storage system 150 and analyzed to determine what an average March day is for the geographic area. In this example, the weather and climate information includes that the sun rises at 6:00 am and sets at 6 pm on an average in the month of March. Also included are the positions of the sun in relation to the geographic area at 7:00 am, 12:00 pm, and 5:00 pm and the intensity of the sun on average.

Figure 4:
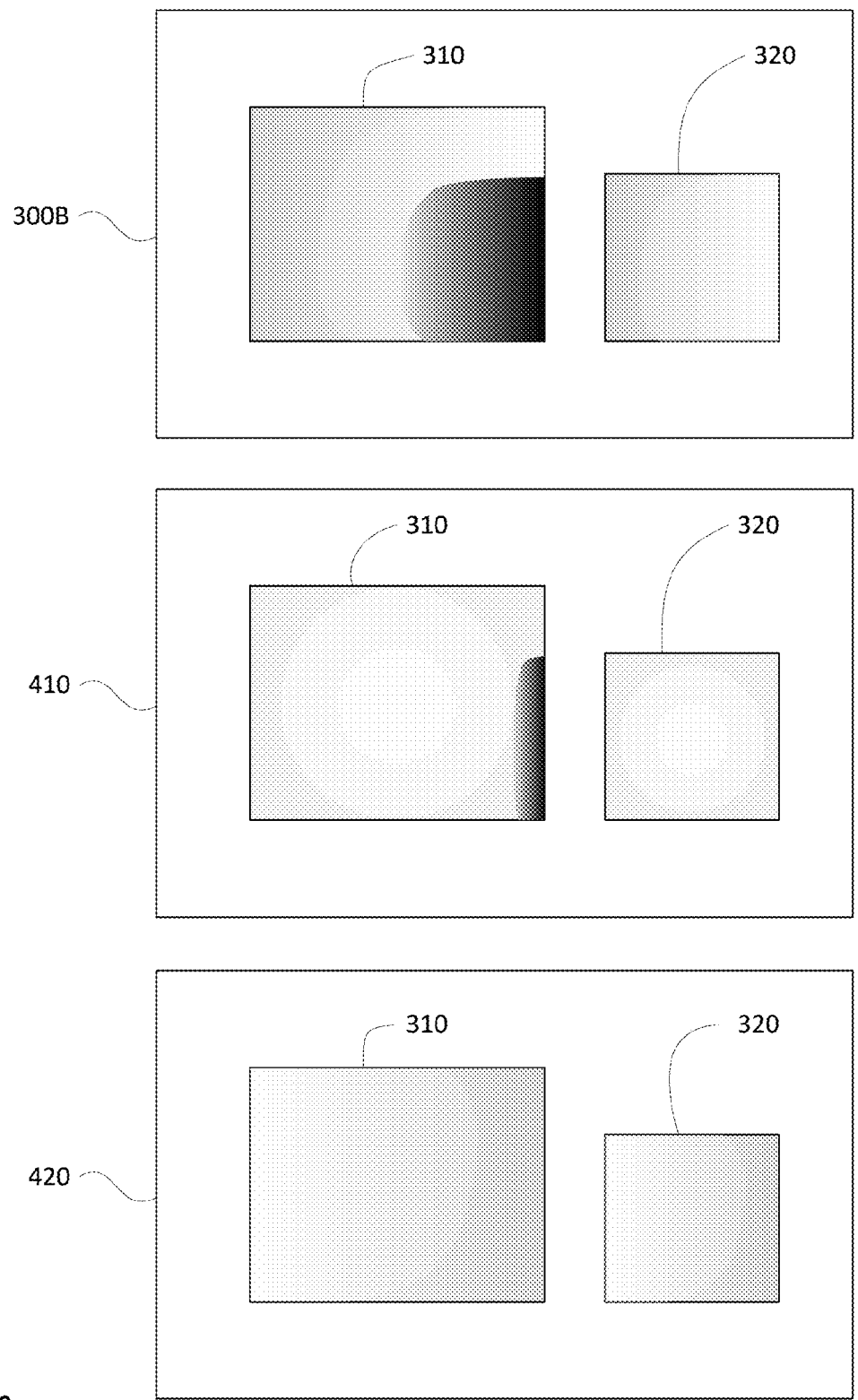
FIG. 4 shows examples of images of the geographic area that are formed in accordance with aspects of the disclosure.

Using the generated solar flux, a plurality of images may be generated for the identified geographic area, as shown in FIG. 4. A 2D map image may be retrieved from the storage system 150 or generated from the physical environment information. The 2D map image may be a satellite image of the geographic area viewed from above. Solar flux corresponding to a plurality of points in time of a day may then be projected onto roofs of buildings in the geographic area to generate the plurality of images. Solar flux may be projected onto the 2D map image using just projection, draping, and/or spraying. Projection involves projecting solar flux directly onto the 2D map, regardless of the geometry of buildings. Draping involves projecting solar flux onto the highest surface in the 2D map. Spraying involves projecting solar flux onto the surface having a high likelihood value to be a roof. The likelihood value for a particular surface may be determined based on the geometry information of the physical environment. For example, surfaces that are mostly or very close to horizontal, or laying at 0°±10° with respect to the surface of the earth, and that are over a threshold distance from the surface of the earth, such as 10 feet, the likelihood value is high. For surfaces that are mostly or very close to vertical, or laying at 90°±30° with respect to the surface of the earth, or that are below the threshold distance from the surface of the earth, the likelihood value is low.

The solar flux may additionally be projected onto any surface where it is also possible to install a solar panel, such as any other horizontal or near-horizontal surfaces in the geographic area. The solar flux may be displayed as a gradient of colors corresponding to amount of solar flux for a given point in time. The gradient of colors may include, for example, yellow for areas of greatest solar flux, orange for areas of moderate solar flux, and purple for areas of little to no solar flux. In that regard, each image in the plurality of images may display solar flux at different points in time in the time frame.

Figure 3B:
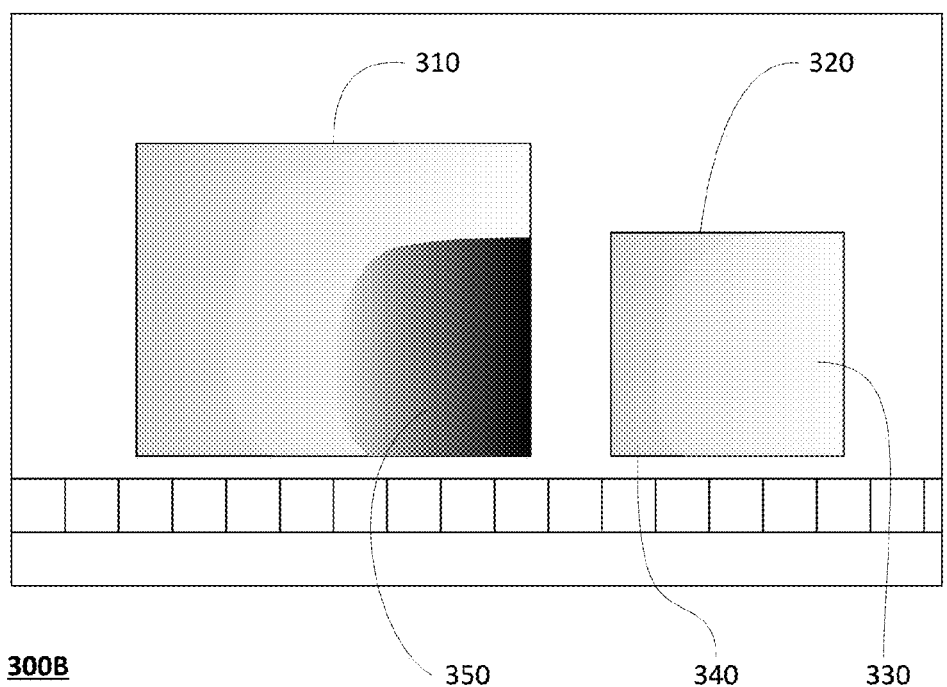
FIG. 3B is a top-down view of the buildings in the geographic area in accordance with aspects of the disclosure.

For example, after combining weather and climate with the physical environment to derive solar flux, image 300B is generated in FIG. 3B for the geographic area containing the first building 310 and the second building 320. Image 300B is a top-down view of the first building 310 and the second building 320 at 7:00 am. Solar flux is displayed in image 300B with a gradient colors with white for areas of greatest solar flux, grey for areas of moderate solar flux, and black/dark grey for areas little to no solar flux. Because the sun is positioned in the east at a low angle at 7:00 am in the geographic area, white area 330 is on the east side of the roof of second building 320 and grey area 340 is on the west side of the roof of second building 320. Despite the sun being low in the east, the first building 310 has a black/dark grey area 350 on the east side because of the second building 320 casts a shadow onto the first building 310 due to the difference in height of the two buildings. The shadow results in a sharp decrease or absence of solar flux. As a static image, without more information about the difference in height of the buildings, it may not be immediately clear why the black/dark grey area 350 is on the east side of the roof of the first building 310.

The plurality of images may include images displaying solar flux at points in time separated by predetermined intervals, such as one hour, or more or less, between sunrise and sunset. For instance, a first image in the plurality of images may show solar flux for the geographic area at 6:00 am, a second image in the plurality of images may show solar flux for the geographic area at 7:00 am, and so on.

FIG. 4 shows three images that are generated for the geographic area for different points in the day. As discussed above, image 300B displays solar flux for 8:00 am, when the sun is low in the east at the geographic area. Image 410 displays solar flux for 12:00 pm, when the sun is almost directly above the geographic area. White areas showing the greatest amount of solar flux are at the centers of the roofs of the first building 310 and the second building 320, with a little bit of grey areas at the edges of the roofs. Black/dark grey area on the roof of the first building 310 is reduced to a small sliver on the east side. Image 420 displays solar flux for 5:00 pm, when the sun is low in the west at the geographic area. White areas are on the west sides of the first building 310 and the second building 320 with grey areas on the east sides. No black/dark grey areas are on either roof because the height of the first building is less than the height of the second building. Therefore, the first building 310 does not cast a shadow on the second building 320. With the sun in the west, the shadow of the second building 320 now falls to the east and does not fall onto the first building 310.

Figure 5:
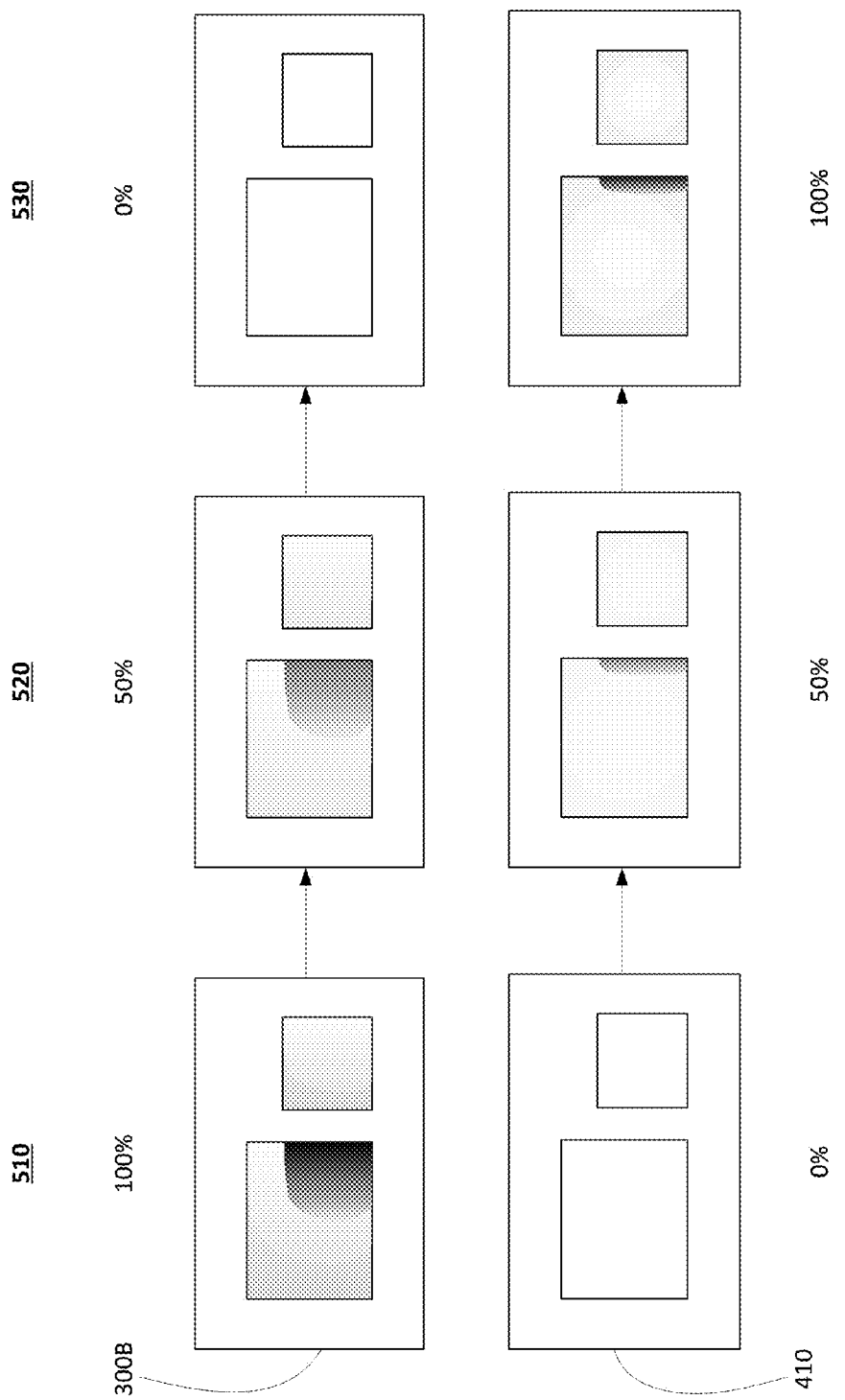
FIG. 5 is a diagram showing a transition between images of the geographic area in accordance with aspects of the disclosure.

An animated presentation may be created by displaying the plurality of images in chronological order with transitions between pairs of images in the plurality of images, as shown in FIG. 5. The transitions between the images may include a gradual change in opacity of one or more images. In one example, a first image of the plurality of images may be overlaid with a second image of the plurality of images such that geographic locations in the first image are overlaid by the same geographic locations in the second image. The first image may present solar flux at a first point in time and be displayed with 100% opacity. The second image may present solar flux at a second point in time later than the first point in time and be displayed with 0% opacity. To transition from the first image to the second image, the opacity of the first image may gradually be changed to 0%, and the opacity of the second image is gradually changed to 100%. The opacity change of the first image may occur simultaneously with the opacity change of the second image. In addition, the rate of opacity change of the first image may be the same as the rate of opacity change of the second image; as such, when the opacity of the first image is at 90%, the opacity of the second image is at 10%; when the opacity of the first image is at 80%, the opacity of the second image is at 20%; and so on.

The animated presentation may be sent to and received by the requesting client computing device 120, for display to a user 220. In response to user input, the one or more computing devices 110 may play the animation. For example, a play button may receive user input. In response to other user input, the one or more computing devices 110 may navigate between images in the created animated presentation. For example, a slider tool may receive user input to navigate forwards or backwards in time in the animated presentation. The length of the slider tool may correspond to the chronological length of the animated presentation. Depending on the selected position on the slider tool, a snapshot from the chronology of the animated presentation is shown. With the animated presentation a link to a webpage showing how solar flux was determined for the geographic area, in this example, 123 Main Street, Anytown, Calif. 12345, may be provided.

In FIG. 5, image 300B is overlaid with image 410 such that the first building 310 and the second building 320 are aligned. To more clearly illustrate the change in opacity in both images, image 300B and image 410 are displayed separately in FIG. 5. At first transition point 510, image 300B is at 100% opacity and image 410 is at 0% opacity. Then, the opacity of image 300B decreases at the same time the opacity of image 410 increases so that at second transition point 520 both image 300B and image 410 are at 50% opacity. The change in opacity continues until, at third transition point 530, image 300B is at 0% opacity and image 410 is at 100% opacity. The transition process is then repeated with image 410 and image 420, with image 410 starting at 100% opacity and image 420 starting at 0% opacity.

In alternate examples, the server computing devices 110 may receive previously generated solar flux or retrieve from storage system 150 stored solar flux in order to generate the animated presentation. In addition, generating the plurality of images may include use of a height map to modify the solar flux to determine solar flux at given heights.

In other examples, various geographic areas and points of time in a day may be batch processed in order to generate maps for larger geographic areas given the solar flux presently available. In other words, the identified geographic area may be divided into a plurality of smaller geographic areas and the timespan of a day may be divided into a plurality of smaller time frames. In batch processing, the plurality of images may be generated for the geographic area by processing solar flux for the plurality of smaller geographic areas and/or for the plurality of smaller time frames concurrently, or in parallel. For a given image of the geographic area, solar flux may be determined for every pixel of the given image, and the pixels may be assembled to form the given image. Data from which solar flux is determined may be received as a plurality of datasets, in which case batch processing may include concurrently processing the plurality of datasets for the given image. Results of batch processing the plurality of datasets may be merged to generate the given image. Merging may be accomplished by blending or selecting the pixels from the most recent dataset.

Figure 6:
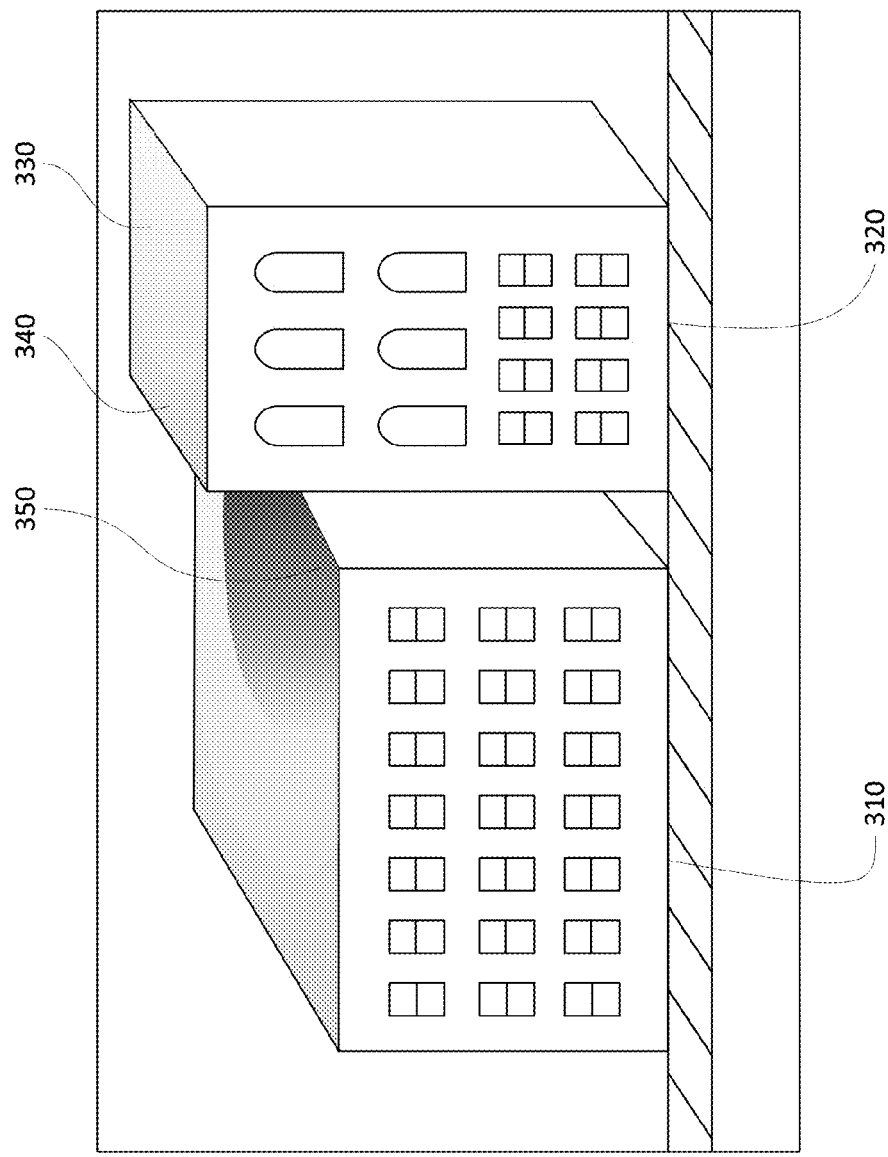
FIG. 6 is an example three-dimensional model that is formed in accordance with aspects of the disclosure.

As an alternative, rather than using a plurality of 2D images to create an animation, a 3D model of the geographic area may be used. The 3D model may include buildings, trees, signs, and other objects that are fixed in the geographic location. The solar flux may be projected into the 3D model. Specifically, solar flux may be displayed on areas where a solar panel may be placed in the 3D model. For example, roofs of the buildings. Solar flux may not be displayed on portions of the 3D model where a solar panel is unsuitable or improper. As shown in FIG. 6, 3D model 600 includes the first building 310 and the second building 320. The solar flux in the geographic area at 7:00 am in the month of March may be projected onto the roofs of the first building 310 and the second building 320. As a result, white area 330 illustrating an area of high solar flux and a grey area 340 illustrating an area of moderate solar flux are displayed respectively on the east side and west side of the roof of the second building 320. A black/dark grey area 350 representing an area of little to no solar flux is on the east side of the roof of building 310 due to the shadow cast by the second building 320, as discussed above. The other surfaces of the first building 310 and the second building 320 do not display solar flux since solar panels may not be installed on the sides of the first and second buildings.

The 3D model may be generated from the same stereo imagery and/or range information collected for generating solar flux, in which case the solar flux may be automatically included in the 3D model when it is generated from the stereo imagery and/or range information. The 3D model may then be displayed with the solar flux for a given point in time of a day. The display of the 3D model may change based on user input. For example, the 3D model may be turned to be viewed at a different angle. The received user input may specify at least one of an angle and a zoom of the 3D model.

In some examples, when looking at a particular view of the 3D model, a user may view an animation of the flux displayed on the 3D model. In this example, the plurality of images may correspond to the particular view and may be generated and displayed as described above. In other examples, the 3D model may be viewed with solar flux of a given point in time of a day without any animation. In this example, a user may navigate the 3D model, providing user input to change the location, angle, or zoom of the view of the 3D model of the geographic location.

The features described above may be used to present solar flux with other information in an intuitive manner A user may input an address to access a map. An animated map provides the user solar flux including how solar flux varies over the course of time instead of a single snapshot of solar flux. The user therefore receives more by viewing an animated map than a traditional 2D static map. A 3D map provides the user solar flux in the context of 3D space which not only allows users to recognize locations easier but also allows user to visualize where solar panels may be placed, for instance on a particular building, in order to most efficiently generate electricity. In addition to presenting more information, presenting solar flux in an animation or in 3D makes it much more clear what is displayed and why. The clarity of the presentation mitigates user confusion of the flux overlay as merely aesthetic rather than functional.

Figure 7:
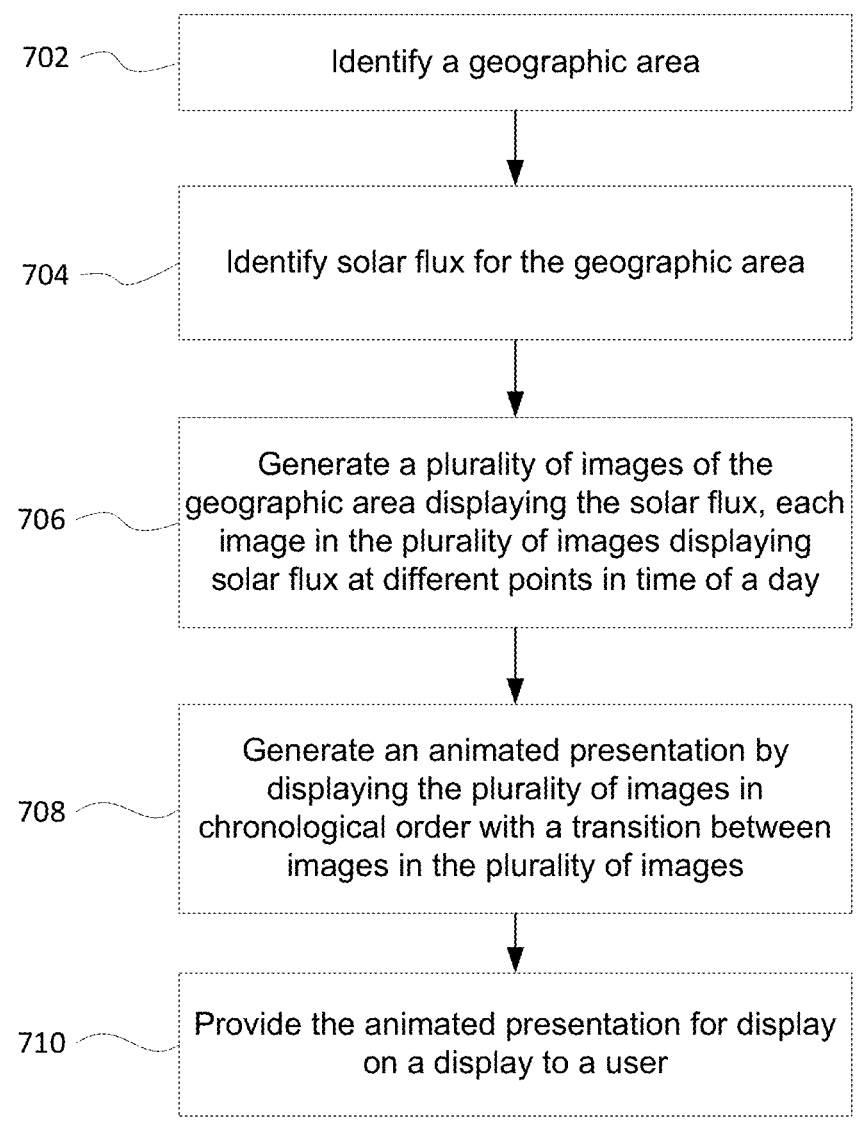
FIG. 7 is an example flow diagram in accordance with aspects of the disclosure.

FIG. 7 is an example flow diagram 700 in accordance with some of the aspects described above that may be performed by one or more computing devices such as server computing devices 110. In one embodiment, a geographic area is identified at block 702. Then, solar flux is identified for the geographic area at block 704. A plurality of images is then generated of the geographic area displaying the solar flux at block 706. Each image in the plurality of images displays solar flux at different points in time of a day. An animated presentation is generated by displaying the plurality of images in chronological order with a transition between images in the plurality of images at block 708. The animated presentation is displayed on a display to a user at block 710. The display may be a display on a client computing device, such as client computing device 120.

Unless stated otherwise, the foregoing alternative examples are not mutually exclusive. They may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method comprising:
   identifying, by one or more processors, a geographic area having a plurality of buildings;
   identifying, by the one or more processors, surfaces of the plurality of buildings in the geographic area on which a solar panel may be installed;
   identifying, by the one or more processors, geometry information including information identifying which surfaces of the plurality of buildings are higher than other surfaces of the plurality of buildings;
   identifying, by the one or more processors, solar flux for the geographic area based at least on the geometry information including the information identifying which surfaces of the plurality of buildings are higher than other surfaces of the plurality of buildings;
   generating, by the one or more processors, a plurality of images of the geographic area displaying the solar flux on the identified surfaces, each image in the plurality of images displaying the solar flux at different points in time of a day;
   generating, by the one or more processors, an animated presentation by displaying the plurality of images in chronological order with a transition between images in the plurality of images; and
   providing, by the one or more processors, the animated presentation for display on a display to a user.

2. The method of claim 1, wherein generating the plurality of images of the geographic area further comprises using the solar flux to project a gradient of colors corresponding to amount of solar flux onto the identified surfaces.

3. The method of claim 1, wherein the transition between the images includes a gradual change in opacity of one or more images.

4. The method of claim 3, wherein the transition between the images includes a gradual increase in opacity of a first image of the plurality of images and a gradual decrease in opacity of a second image of the plurality of images.

5. The method of claim 1, wherein the transition between the images is controllable based on user input selecting a point in time within the day.

6. The method of claim 5, wherein the user input is received via a slider tool.

7. The method of claim 1, wherein the geographic area and the different points in time are identified by receiving user input related to the geographic area and the different points in time.

8. The method of claim 1, further comprising:
   generating, by the one or more processors, a three-dimensional model of the geographic area; and
   projecting, by the one or more processors, the solar flux into the three-dimensional model;
   wherein the plurality of images is of a selected view of the three-dimensional model.

9. The method of claim 1, wherein the plurality of images of the geographic area is generated by:
   dividing the geographic area into a plurality of smaller areas; and
   batch processing the solar flux for the plurality of smaller areas.

10. The method of claim 1, wherein the surfaces in the geographic area on which a solar panel may be installed are identified by determining that a given surface is at an angle of $0°\pm10°$ from a surface of Earth.

11. The method of claim 1, further comprising determining the solar flux displayed on at least one of the identified surfaces based on a shadow location on the identified surface at a given point in time of the day, the solar flux of the shadow location is decreased or absent; and
   wherein the animated presentation displays changes in location of decreased or absent solar flux on the at least one of the identified surfaces.

12. A system comprising one or more processors configured to:
   identify a geographic area having a plurality of buildings;
   identify surfaces of the plurality of buildings in the geographic area on which a solar panel may be installed;
   identify geometry information including information identifying which surfaces of the plurality of buildings are higher than other surfaces of the plurality of buildings;
   identify solar flux for the geographic area based at least on the geometry information including the information identifying which surfaces of the plurality of buildings are higher than other surfaces of the plurality of buildings;
   generate a plurality of images of the geographic area displaying the solar flux on the identified surfaces, each image in the plurality of images displaying the solar flux at different points in time of a day;
   generate an animated presentation by displaying the plurality of images in chronological order with a transition between images in the plurality of images; and
   provide the animated presentation for display on a display to a user.

13. The system of claim 12, wherein the one or more processors are further configured to:
   generate a three-dimensional model of the geographic area; and
   project the solar flux into the three-dimensional model;

wherein the plurality of images is of a selected view of the three-dimensional model.

14. The system of claim 13, wherein projecting the solar flux into the three-dimensional model comprises projecting a gradient of colors corresponding to amount of solar flux onto the identified surfaces.

15. The system of claim 12, wherein the transition between the images includes a gradual change in opacity of one or more images.

16. The system of claim 15, wherein the transition between the images includes a gradual increase in opacity of a first image of the plurality of images and a gradual decrease in opacity of a second image of the plurality of images.

17. The system of claim 12, wherein the one or more processors are further configured to:
   receive user input related to the geographic area and the different points in time; and
   send the animated presentation to a client device for display.

18. A non-transitory, tangible machine-readable medium on which instructions are stored, wherein the instructions, when executed by one or more processors, cause the one or more processors to perform a method, the method comprising:
   selecting a geographic area having a plurality of buildings;
   identifying surfaces of the plurality of buildings in the geographic area on which a solar panel may be installed;
   identifying geometry information including information identifying which surfaces of the plurality of buildings are higher than other surfaces of the plurality of buildings;
   identifying solar flux for the geographic area based at least on the geometry information including the information identifying which surfaces of the plurality of buildings are higher than other surfaces of the plurality of buildings;
   generating a plurality of images of the geographic area displaying the solar flux on the identified surfaces, each image in the plurality of images displaying the solar flux at different points in time of a day;
   generating an animated presentation by displaying the plurality of images in chronological order with a transition between images in the plurality of images; and
   providing the animated presentation for display on a display to a user.

19. The medium of claim 18, wherein the method further comprises:
   generating a three-dimensional model of the geographic area; and
   projecting the solar flux into the three-dimensional model;
   wherein the plurality of images is of a selected view of the three-dimensional model.

20. The medium of claim 18, wherein the transition between the images includes a gradual change in opacity of one or more images.

* * * * *